United States Patent

Ogaki et al.

[11] Patent Number: 5,893,124
[45] Date of Patent: Apr. 6, 1999

[54] JOB PROCESSING APPARATUS AND METHOD FOR PREPARING AN INSTRUCTION SHEET HAVING A PREDETERMINED FORMAT AND FOR EXECUTING AN INSTRUCTION INCLUDED ON THE INSTRUCTION SHEET

[75] Inventors: Takeshi Ogaki, Tokyo; Shiro Takagi; Yoshiko Takeda, both of Yokohama, all of Japan

[73] Assignee: Kabushiki Kaisha Toshiba, Kawasaki, Japan

[21] Appl. No.: 845,059

[22] Filed: Apr. 21, 1997

Related U.S. Application Data

[63] Continuation of Ser. No. 562,648, Nov. 27, 1995, abandoned, which is a continuation of Ser. No. 160,226, Dec. 2, 1993, abandoned.

[30] Foreign Application Priority Data

Dec. 3, 1992 [JP] Japan .................................... 4-323860

[51] Int. Cl.$^6$ ...................................................... G06F 3/00
[52] U.S. Cl. ........................... 707/507; 345/326; 358/401; 395/561
[58] Field of Search .................................... 707/507, 500; 358/401; 345/326, 125; 395/561

[56] References Cited

U.S. PATENT DOCUMENTS

| | | | |
|---|---|---|---|
| Re. 34,429 | 11/1993 | Baran et al. ........................ | 379/100.11 |
| 4,566,127 | 1/1986 | Sekiya et al. ............................ | 382/175 |
| 4,718,784 | 1/1988 | Drisko ....................................... | 400/68 |
| 4,862,386 | 8/1989 | Axelrod et al. ........................ | 707/507 |
| 4,933,979 | 6/1990 | Suzuki et al. ........................... | 382/173 |
| 4,937,439 | 6/1990 | Wanninger et al. .................... | 235/456 |
| 4,958,551 | 9/1990 | Lui ........................................... | 84/462 |
| 5,041,918 | 8/1991 | Ishida et al. ............................ | 358/442 |
| 5,047,960 | 9/1991 | Sloan ...................................... | 707/507 |
| 5,050,007 | 9/1991 | Akanabe et al. ........................ | 358/451 |
| 5,051,779 | 9/1991 | Hikawa .................................... | 399/84 |
| 5,058,185 | 10/1991 | Morris et al. ........................... | 382/305 |
| 5,099,340 | 3/1992 | Kamada et al. ........................ | 358/403 |
| 5,121,448 | 6/1992 | Katayama et al. ..................... | 382/284 |
| 5,146,833 | 9/1992 | Lui ........................................... | 84/462 |
| 5,150,434 | 9/1992 | Hori et al. .............................. | 382/282 |
| 5,179,649 | 1/1993 | Masuzaki et al. ...................... | 707/507 |
| 5,222,211 | 6/1993 | Mueller et al. ......................... | 707/506 |
| 5,237,628 | 8/1993 | Levitan .................................... | 382/175 |
| 5,239,388 | 8/1993 | Matsumoto ............................. | 358/448 |
| 5,247,611 | 9/1993 | Norden-Paul et al. ................. | 707/504 |
| 5,251,273 | 10/1993 | Betts et al. .............................. | 382/311 |
| 5,251,291 | 10/1993 | Malcolm ................................. | 707/539 |
| 5,325,478 | 6/1994 | Shelton et al. ......................... | 707/507 |
| 5,340,966 | 8/1994 | Morimoto ............................... | 235/376 |
| 5,362,948 | 11/1994 | Morimoto ............................... | 235/376 |
| 5,444,828 | 8/1995 | Kataoka .................................. | 395/117 |
| 5,459,796 | 10/1995 | Boyer ...................................... | 382/187 |
| 5,485,368 | 1/1996 | Ogaki et al. ............................ | 364/191 |
| 5,500,932 | 3/1996 | Sasakura et al. ....................... | 707/507 |
| 5,515,144 | 5/1996 | Miyasaka et al. ...................... | 399/1 |
| 5,555,325 | 9/1996 | Burger .................................... | 382/309 |

FOREIGN PATENT DOCUMENTS

| | | |
|---|---|---|
| 1-284167 | 11/1989 | Japan . |
| 3-63877 | 3/1991 | Japan . |
| 4-18844 | 1/1992 | Japan . |

Primary Examiner—Zami Maung
Attorney, Agent, or Firm—Pillsbury Madison & Sutro LLP

[57] ABSTRACT

An instruction sheet designer designs a handwriting sheet which allows execution of an arbitrary program by handwriting job instructions. The format of the handwriting sheet is stored as print data in a print data memory. If a job instruction is to be input, the handwriting sheet is printed on the basis of the print data stored in the print data memory or information based on the print data is displayed on the screen at a terminal. The job contents can be instructed in a look and feel manner in accordance with a sheet input, a key input, or a mouse input.

13 Claims, 10 Drawing Sheets

DOCUMENT SEARCH                              P ↗   10100*

USER ID              1 2 3 4 5 6 7 8
OPTICAL DISK No      2 4 6 8
CLASS No. 1          R 0 0 1
CLASS No. 2          S 3 4 5
KEY WORDS            T O Y
                     R O B O T
                     ■ YES  □ NO

[IMAGE DATA AREA]

PRINT

FIG. 2B

DOCUMENT SEARCH                              31 ↗   10100*

USER ID              1 2 3 4 5 6 7 8
OPTICAL DISK No.     2 4 6 8
CLASS No. 1          R 0 0 1
CLASS No. 2          S 3 4 5
KEY WORDS            T O Y
                     R O B O T
                     ■ YES  □ NO

[toy robot image]

PRINT

FIG. 3

| SHEET NO. | PARTS NO. | PARTS CLASS | PARTS AREA | PARTS ATTRIBUTE |
|---|---|---|---|---|
| 10100 | 1 | STRING | (200,100,400,60) | "DOCUMENT SEARCH" |
| | 2 | STRING | (1500,100,400,40) | "10100" |
| | --- | --- | --- | --- |
| | 17 | MARK | (750,1100,300,60) | "YES" |
| | 18 | MARK | (1150,1100,300,60) | "NO" |
| | 19 | IMAGE | (1000,1500,800,600) | "BIT MAP PIC." |

| SHEET No. | PARTS No. | RECOG. CLASS | RECOG. AREA | PARAMETER NAME |
|---|---|---|---|---|
| 10100 | 4 | NUMBER | (80,300,500,60) | USER ID |
| | 6 | NUMBER | (800,400,250,60) | OD ID |
| | 8 | NUMBER | (800,500,250,60) | CLASS 1 |
| | 10 | NUMBER | (800,600,250,60) | CLASS 2 |
| | 12 | ALPHANUMERIC | (800,700,625,60) | KEY 1 |
| | 13 | ALPHANUMERIC | (800,700,625,60) | KEY 2 |
| | --- | --- | --- | --- |
| | 17 | MARK | (800,1100,60,60) | PRINT ON |
| | 18 | MARK | (1200,1100,60,60) | PRINT OFF |

220a  220b  220c  220d  220e

ED

| SHEET No. | PROGRAM NAME | PARAMETER NAME |
|---|---|---|
| 10100 | KENSAKU | OD ID, CLASS 1, CLASS 2, KEY 1, KEY2,··· |
| ⋮ | ⋮ | ⋮ |

| SHEET No. | PARAMETER NAME | VALUES |
|---|---|---|
| 10100 | USER ID | 12345678 |
| 10100 | OD ID | 2468 |
| ⋮ | ⋮ | ⋮ |

JOB PROCESSING APPARATUS AND METHOD FOR PREPARING AN INSTRUCTION SHEET HAVING A PREDETERMINED FORMAT AND FOR EXECUTING AN INSTRUCTION INCLUDED ON THE INSTRUCTION SHEET

This is a continuation of application Ser. No. 08/562,648, filed on Nov. 27, 1995, which was abandoned upon the filing hereof which is a continuation of application Ser. No. 08/160,226, filed Dec. 2, 1993, abandoned.

BACKGROUND OF THE INVENTION

1. Field of the Invention

The present invention relates to a job instruction processing apparatus capable of automatically processing a job instruction handwritten on a sheet at a workstation (WS) or personal computer (PC) connected to, e.g., a facsimile apparatus (FAX).

2. Description of the Related Art

As a conventional apparatus for automatically processing a job instruction handwritten on a sheet, for example, Jpn. Pat. Appln. KOKAI Publication No. 4-18844 proposes an apparatus in which a fixed identification pattern (e.g., a bar code) for instructing a destination of an electronic mail is printed on a FAX transmission sheet, this identification pattern is recognized to specify the destination of the electronic mail, and the contents of FAX reception are automatically transferred as the electronic mail. According to this apparatus, the load on a FAX sender can be reduced without troubling the sender about the procedure of an electronic mail.

Jpn. Pat. Appln. KOKAI Publication No. 3-63877 also discloses an apparatus in which necessary information is read from a transmitted FAX document to retrieve desired data from an image database (DB), and a retrieved result is transmitted through a FAX. This apparatus can access the database apparatus from an existing FAX terminal.

In addition, Jpn. Pat. Appln. KOKAI Publication Nos. 1-264359, 1-284167, and 4-86913 disclose a technique associated with a recognition error countermeasure using a remote control FAX instruction, a technique of processing a FAX input sheet for repeating multi-address calling, and a technique of improving the operability associated with cursor movements, respectively.

All these conventional examples, however, are limited to FAX transmission jobs, and the transfer destination of an electronic mail is fixed by the FAX transmission sheet.

When the exchange of instructions of job contents and results of job execution by a plurality of persons is taken into consideration, a person engaged in one job does not necessarily utilize the same equipment under the same circumstance. A difference in equipment configuration including a FAX apparatus, a workstation, a personal computer, and the like results in a great difference in a method of instructing job contents except for direct communication.

As described above, in the conventional examples, the kinds of executable jobs are limited, and different methods of instructing job contents must be used for different equipment configurations. Therefore, job instructions are overloaded.

SUMMARY OF THE INVENTION

It is, therefore, an object of the present invention to provide a job instruction processing apparatus capable of instructing jobs without limiting the kinds of jobs in accordance with a look and feel common to users even if equipment configurations are different from each other.

In order to achieve the above object, according to the present invention, there is provided a job instruction processing apparatus comprising sheet preparing means for preparing an instruction sheet in which a job instruction can be handwritten, sheet input means for inputting the job instruction using the instruction sheet prepared by the sheet preparing means, display means for displaying, on a screen, an instruction sheet identical to the instruction sheet prepared by the sheet preparing means, operation input means for inputting the job instruction on the basis of display contents on the display means, and processing means for executing processing in accordance with the job instruction input from one of the operation input means and the sheet input means.

With the above arrangement, an instruction sheet which instructs job contents can be designed, and a method without using the sheet can be selected as a method of instructing a job. Therefore, job instructions can be given in accordance with appropriate methods.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described with reference to the accompanying drawings.

Figure 1:
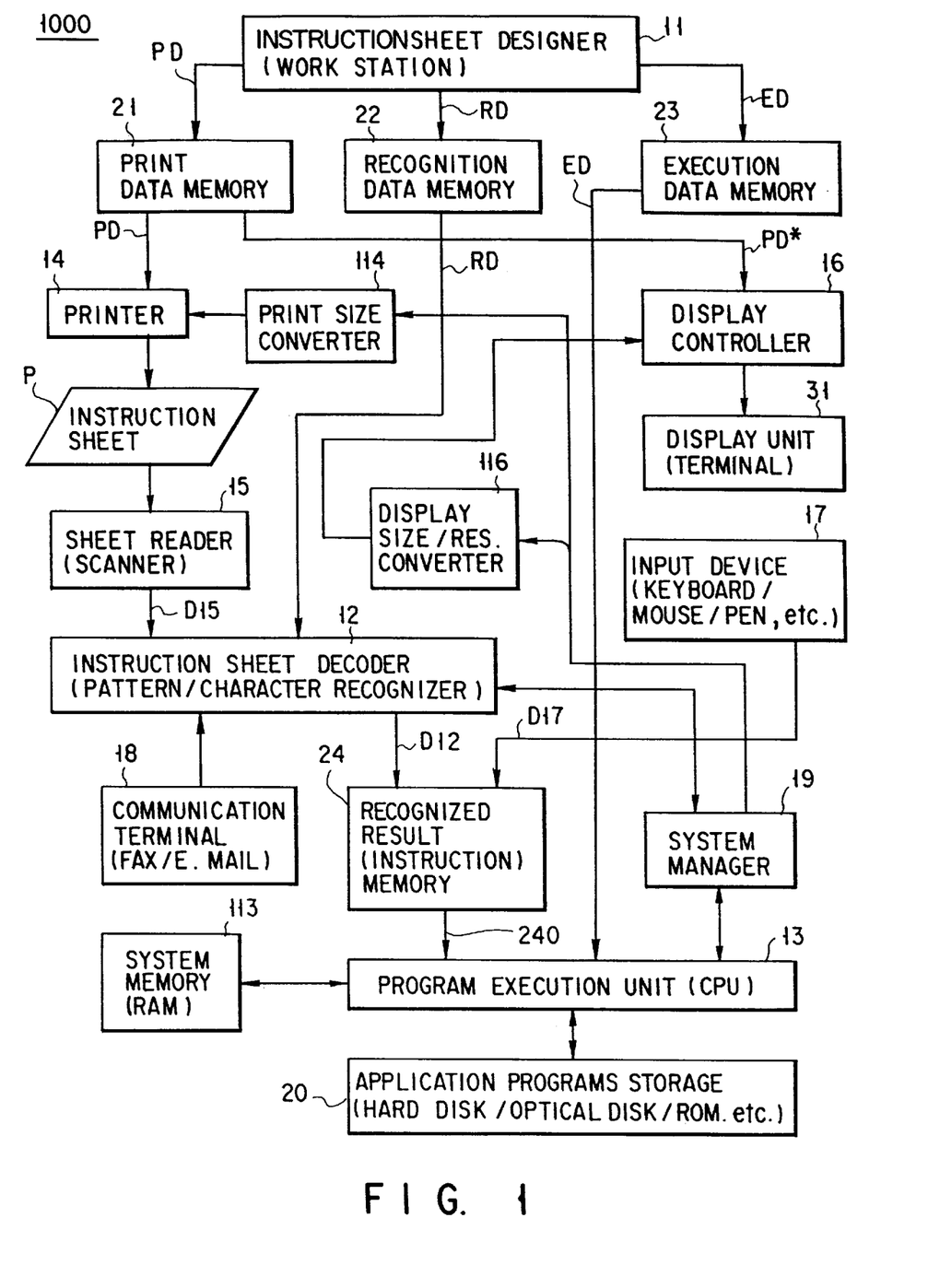
FIG. 1 is a block diagram showing the overall arrangement of a job instruction processing apparatus according to an embodiment of the present invention.

FIG. 1 schematically shows the arrangement of job instruction processing apparatus 1000 according to the present invention.

This job instruction processing apparatus 1000 mainly comprises instruction sheet designer 11, instruction sheet decoder 12, and program execution unit 13.

Instruction sheet designer 11 provides a function of designing instruction sheet (to be referred to as a handwriting sheet hereinafter) P in which a job instruction can be handwritten. Instruction sheet designer 11 can generate and edit print data PD, recognition data RD, and execution data ED. Designer 11 can be embodied by a workstation capable of performing image processing.

Print data PD is data describing the format (e.g., a parts layout) of handwriting sheet P and is stored in print data memory 21.

Recognition data RD is data describing a recognition method of handwriting sheet P and is stored in recognition data memory 22.

Execution data ED is data describing the name of a program executed on the basis of, e.g., a recognized result of handwriting sheet P and is stored in execution data memory 23.

Instruction sheet decoder 12 recognizes the contents of a job instructed by handwriting sheet P. Recognized result D12 is stored in recognized result memory 24.

Program execution unit 13 executes a predetermined job program on the basis of recognized result D12 of the handwriting sheet which is stored in recognized result memory 24 or contents D17 of an input operation (to be described later).

Printer 14 prints an instruction sheet format required by a user, on a paper sheet, using print data PD stored in print data memory 21, thereby preparing actual handwriting sheet P.

Printer 14 prints information (a mark * to be described later) for recognizing an instruction sheet on this sheet P and performs similarity conversion of print data PD in accordance with the size of paper, thereby printing instruction sheet P. This similarity conversion is performed by print size converter 114.

Sheet reader 15 reads a job instruction written on handwriting sheet P by the user as an image and transfers read image data D15 to instruction sheet decoder 12.

Display controller 16 uses print data PD stored in print data memory 21 to display an instruction sheet format required by the user on the screen of terminal 31 using, e.g., a workstation or personal computer.

In display controller 16, the print data can be subjected to similarity conversion on the basis of the ratio of the screen size ([number of vertical pixels]×[number of horizontal pixels]) of terminal 31 and the size of handwriting sheet P. This similarity conversion is performed by display size/resolution converter 116.

Display controller 16 also processes an operation input (to be described later) in accordance with display and input processing corresponding to the type of part represented by the print data.

Input device 17 has input devices such as a keyboard, a mouse, and a pen. When a job instruction is input by the user through an operation of the keyboard or mouse, input contents D17 are output in the same format as the recognized result from instruction sheet decoder 12. These input contents D17 are stored in recognized result memory 24.

The format of handwriting sheet P as an output from printer 14 has a look and feel identical to a screen display at terminal 31 as an output from display controller 16. A similarity relationship is maintained between the display screen at display unit 31 and the surface of sheet P.

The format of recognized result D12 as the output from instruction sheet decoder 12 is the same as that of input contents D17 from input device 17, so that identical descriptions (contents) are used. Recognized result D12 and input contents D17 will be described later.

Communication terminal 18 is used to exchange data with another device and connected to instruction sheet decoder 12. For example, when a FAX apparatus is connected as communication terminal 18, transmission/reception of FAX data can be performed.

System manager 19 controls initialization, monitor of operations, and execution of FAX data transmission/reception of an error mode in the overall arrangement in FIG. 1.

Instruction sheet designer 11, instruction sheet decoder 12, program execution unit 13, printer 14, sheet reader 15, display controller 16, and input device 17 may be incorporated in the same machine or different machines in an arbitrary combination.

Figure 2A:
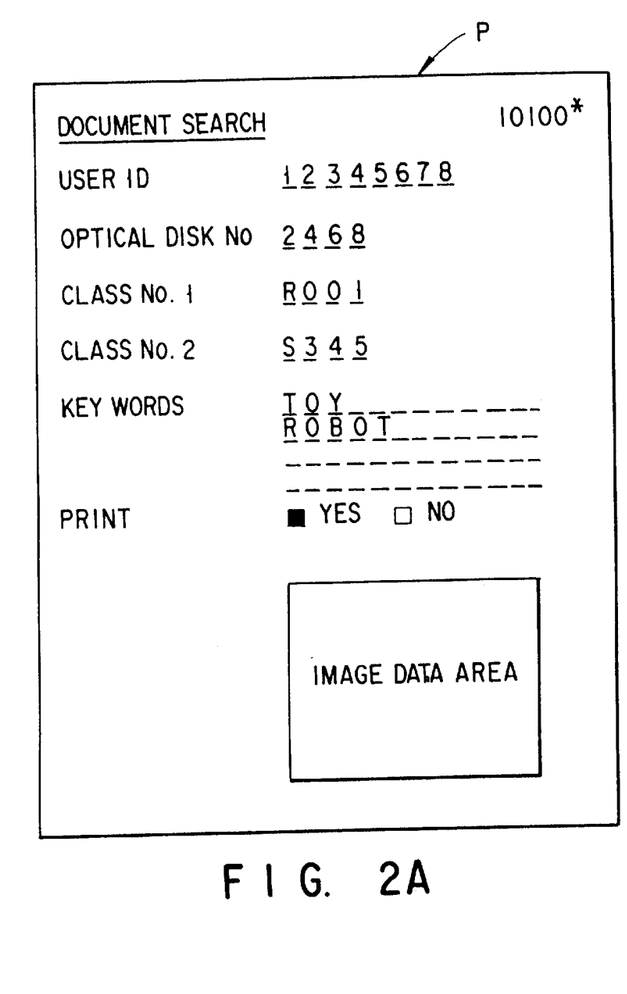
FIGS. 2A and 2B are views illustrating the print contents of instruction sheet P and the display contents at terminal 31 in the embodiment of FIG. 1.
Figure 2B:
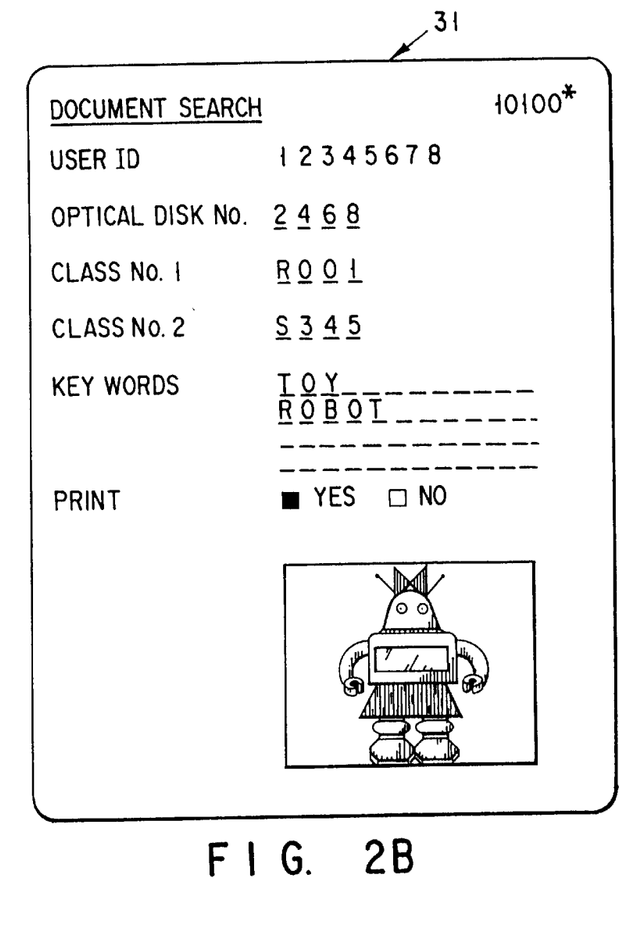

FIG. 2A shows handwriting sheet P for a document search job written on a paper sheet. FIG. 2B shows a case in which the instruction sheet for the document search job is displayed on the screen at terminal 31.

In this case, character string "Document Search" representing the job name, mark "*" for identifying that handwriting sheet P is an authentic instruction sheet and for positioning sheet P, and sheet No. "10100" are printed at the upper portion of handwriting sheet P (FIG. 2A).

An area for handwriting parameters necessary for the document search job is formed parallel to the character strings for explaining these parameters in the lower portion of sheet P.

For example, a parameter consisting of a 4-digit numeric code (2468) is written in the portion of character string "Optical Disk No." to specify an optical disk subjected to the document search.

A parameter for instructing whether a document obtained as a result of the document search is to be printed is input by painting either "square" corresponding to YES or NO in black in the portion of character string "Print".

An area (image data area) is formed at the lowermost portion of sheet P to input an arbitrary figure as image data.

Similarly, character string "Document Search" representing the name of a job, mark "*" for identifying that sheet P is an authentic instruction sheet, and sheet No. "10100" are displayed at the upper portion of display unit 31 (FIG. 2B).

An area for inputting parameters necessary for the document search job by input device 17 is formed parallel to character strings for explaining these parameters in the lower portion of display unit 31.

For example, a parameter consisting of a 4-digit numeric code (2468) is input in the portion of character string "Optical Disk No." to specify an optical disk subjected to the document search.

A parameter for instructing whether a document obtained as a result of the document search is to be printed is input (clicked) by painting either "square" corresponding to YES or NO in black in the portion of character string "Print".

An area (image data area) is formed at the lowermost portion of display unit 31 to input an arbitrary figure as image data.

As described above, handwriting sheet P as the output from printer 14 has the same format as that of the display screen at terminal 31 as the output from display controller 16 from the look and feel of the user.

The respective parts for determining the layout of instruction sheet P are arbitrarily changed in accordance with the instructed job contents and processing.

Figure 3:
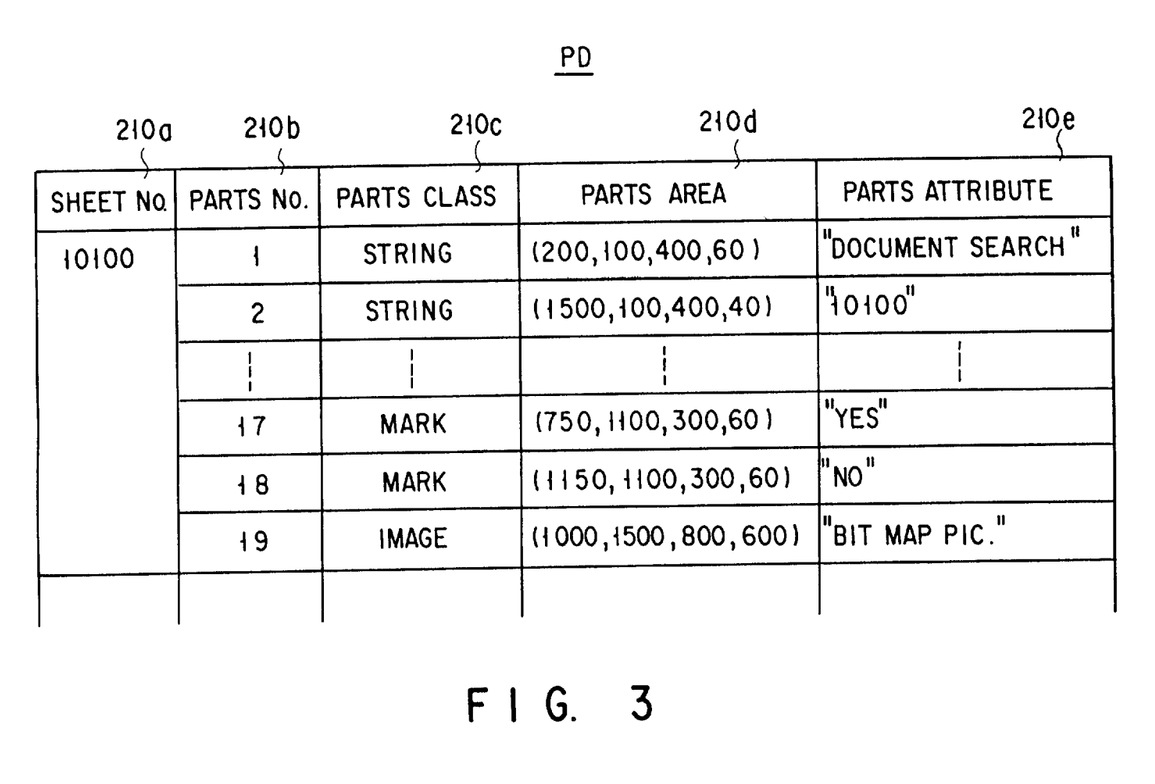
FIG. 3 is a table illustrating print data describing the format of instruction sheets P.

FIG. 3 shows print data PD describing the format of the above instruction sheet.

This is part of print data PD associated with handwriting sheet P shown in FIG. 2A and consists of items of sheet No. 210a, parts No. 210b, parts class 210c, parts area 210d, and parts attribute 210e.

Sheet No. 210a is information for identifying the type of instruction sheet and corresponds to the sheet No. (10100) printed at the right end of the upper portion of handwriting sheet P.

Parts No. 210b is a number assigned to identify each individual part (parameter) arranged on handwriting sheet P.

Parts class 210c sets a selected one of a character string display part (string), a numeric input part (number), an alphanumeric input part (alphanumeric), a kanji input part (kanji), a mark part (mark), or an image part (image).

Parts area 210d represents an item for the position and size of each part on handwriting sheet P. Coordinates (x,y) based on the upper left end of handwriting sheet P as the origin, and the width and height of each part can be described in units of pixels.

Parts attribute 210e represents an item for setting attributes unique to each part. If "string" is written, this part represents character string data.

In this example, a part having parts No. 210b of "1" is set with "string" as parts class 210c, (200,100,400,60) as parts area 210d, and character string "Document Search" as parts attribute 210e.

Other parts are also defined as described above.

Figure 4:
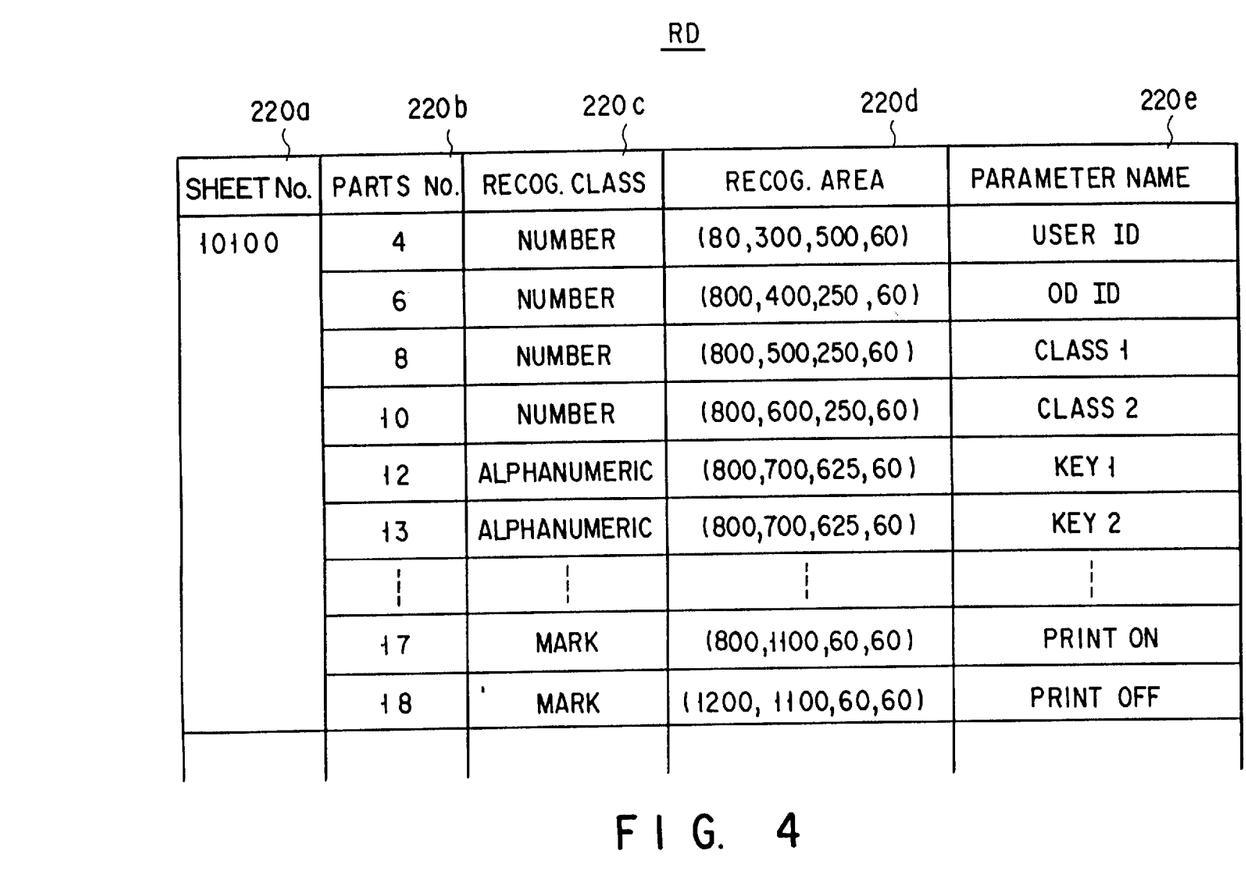
FIG. 4 is a table illustrating recognition data describing recognition methods of instruction sheets P.

FIG. 4 shows recognition data RD which describes a recognition method of the above-mentioned instruction sheet P.

FIG. 4 shows part of recognition data RD associated with handwriting sheet P shown in FIG. 2A. This data consists of items of sheet No. 220a, parts No. 220b, recognition class 220c, recognition area 220d, and parameter name 220e.

Sheet No. 220a is information for identifying the type of instruction sheet and corresponds to the sheet No. (10100) printed at the upper right end of handwriting sheet P.

Parts No. 220b is a number assigned to identify each part arranged on handwriting sheet P.

Recognition class 220c is information for identifying that a target object represents a numeric object (number), an alphanumeric object (alphanumeric), a kanji object (kanji), or a mark object (mark).

Recognition area 220d represents the position of a rectangular area to be recognized on handwriting sheet P.

Parameter name 220e represents the name of a parameter to which recognized results are linked.

In this example, a part having parts No. 220b of "4" is set with a "number" part as parts class 220c, recognition of the contents written in rectangular area (800,300,500,60) as recognition area 220d as an alphanumeric value, and linking of the recognition result to parameter "user id" represented by parameter name 220e. An optical disk No. is used as parameter "or id" corresponding to parts No. "6".

A part having parts No. 220b of "12" is set with an "alphanumeric part" as parts class 220c, recognition of the contents written in rectangular area (800,700,625,60) as recognition area 220d as an alphanumeric value, and linking of the recognized result to parameter "key 1" represented by parameter name 220e.

A part having parts No. 220b of "17" is set with a mark part (mark) as parts class 220c, recognition of the contents written in rectangular area (800,1100,60,60) represented by recognition area 220d as a mark, and linking of the recognized result to parameter "print on" represented by parameter name 220e.

Assuming that the contents written in the area represented by recognition area 220d of the part having parts No. 220b of "4" are recognized as a number represented by recognition class 220c, and that the recognized result is a normal result and has a value, "12345678", the value of parameter "user id" represented by parameter name 220e becomes "12345678".

If the recognized result is an error, the value of parameter "user id" becomes a special value representing an error, e.g., "−1".

Figure 5:
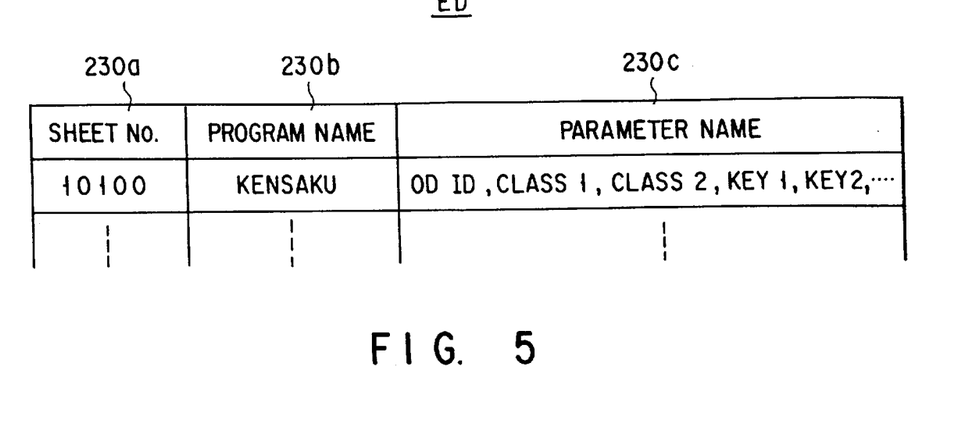
FIG. 5 is a table illustrating execution data describing program names executed on the basis of the recognized result of instruction sheets P.

FIG. 5 shows execution data ED describing the name of a program executed using the recognized result of the above instruction sheet.

This is part of execution data ED associated with handwriting sheet P shown in FIG. 2A and consists of items of sheet No. 230a, program name 230b, and parameter 230c.

Sheet No. 230a is information for identifying the type of instruction sheet and corresponds to the sheet number (10100) printed at the upper right end of handwriting sheet P.

Program name 230b represents the name of a program which is to be started and executed when handwriting sheet P having sheet No. 230a is normally recognized.

Parameter 230c represents a list of parameters to be transferred to a program represented by program name 230b when this program is to be executed.

For example, if handwriting sheet P having sheet No. 230a of "10100" is normally recognized, program "KENSAKU" represented by program name 230b is started and executed. Values "od id, class 1, class 2, key 1, key 2, . . . " are looked up as parameters 230c in the order named.

Figure 6:
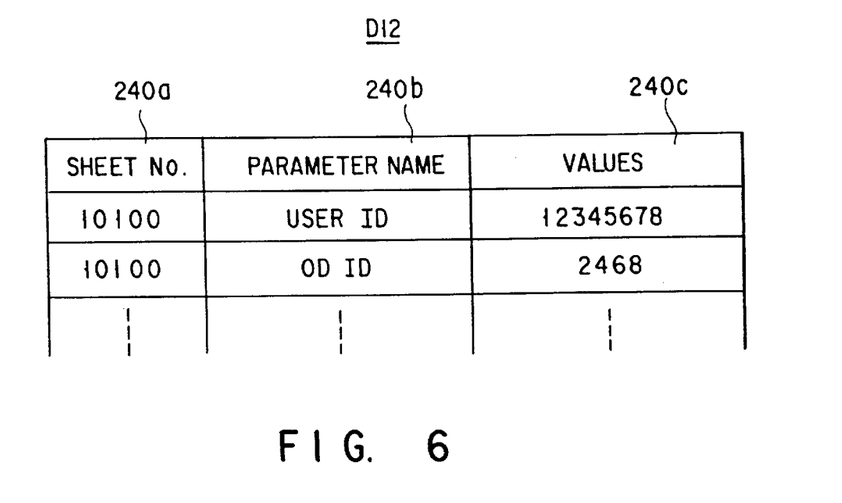
FIG. 6 is a table illustrating recognized results of contents handwritten on instruction sheets P.

FIG. 6 shows recognized result D12 of the above handwriting sheet P.

This recognized result D12, for example, consists of items of sheet No. 240a, parameter name 240b, and value 240c.

Sheet No. 240a is information for identifying the type of instruction sheet and corresponds to the sheet No. (10100) printed at the upper right end of handwriting sheet P shown in FIG. 2A.

Parameter name 240b is identical to parameter name 220e linked by recognition data 220 to a target part of parts described on handwriting sheet P.

Value 240c is a recognized result obtained from instruction sheet decoder 12. If the recognized result represents "string", a character string is set; if "number", a numeric value; if "mark", the presence/absence of a mark.

An operation of the above arrangement will be described below.

Figure 7:
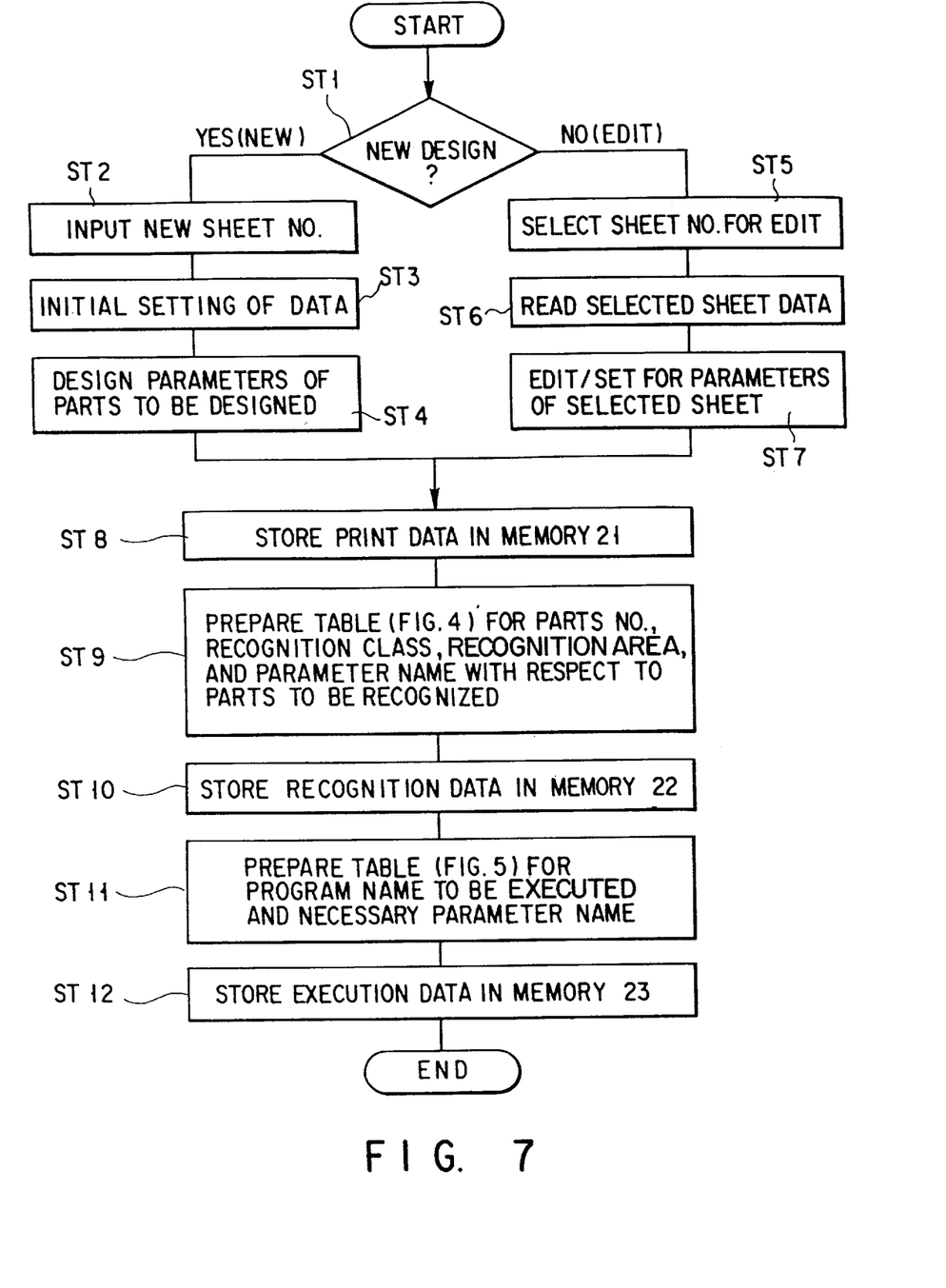
FIG. 7 is a flow chart for explaining a processing flow in instruction sheet designer 11 in the embodiment shown in FIG. 1.

FIG. 7 is a flow chart showing a processing flow in instruction sheet decoder 11.

Instruction sheet designer 11 waits for an instruction operation by a designer for designing handwriting sheet P and operates as follows.

It is determined whether a new design for newly designing a sheet by a sheet designer or an edit design for editing the designed sheet is performed (step ST1).

If a new design is determined (YES in step ST1), a new sheet number is received (step ST2). A print area for print data PD, recognition data RD, and execution data ED as target objects is assured, and initial setting of data is performed (step ST3). An instruction operation of the sheet designer is repeatedly performed to newly set design parameters of parts to be designed (step ST4).

On the other hand, if an edit design is determined (NO in step ST1), the sheet No. of the designed sheet as the target object is received (step ST5), print data PD, recognition data RD, and execution data ED, all of which are associated with the target object, are loaded from a hard disk (not shown) (step ST6). An instruction operation of the sheet designer is repeatedly performed to edit/set parameters of the selected sheet (step ST7).

When the parameters for all the parts of handwriting sheet P are completely set, print data PD is stored in print data memory 21 (step ST8).

A table of recognition class 220c, recognition area 220d, and parameter name 220e of recognition data RD shown in FIG. 4 of necessary parts to be recognized among all the parts of handwriting sheet P is prepared (step ST9).

When settings in the recognition process are completed, recognition data RD is stored in recognition data memory 22 (step ST10).

Using recognized result D12 of handwriting sheet P, a table of program name 230b representing a program to be executed in execution data ED shown in FIG. 5 and the item of parameter name 230c required by this program is prepared (step ST11).

When setting of the program to be executed is completed, execution data ED is stored in execution data memory 23 (step ST12).

By the above operations, print data PD, recognition data RD, and execution data ED are prepared to complete the design of handwriting sheet P.

Upon designing the sheet as described above, print data PD stored in print data memory 21 is supplied to printer 14 to prepare handwriting sheet P shown in FIG. 2A.

Instruction sheet designer 11 outputs print data PD representing the format of handwriting sheet P, i.e., the layout as of character strings and fill-out columns to be printed on a paper sheet. Print data PD* having the same contents as those of this print data PD are used for display at terminal 31 by display controller 16.

Figure 8:
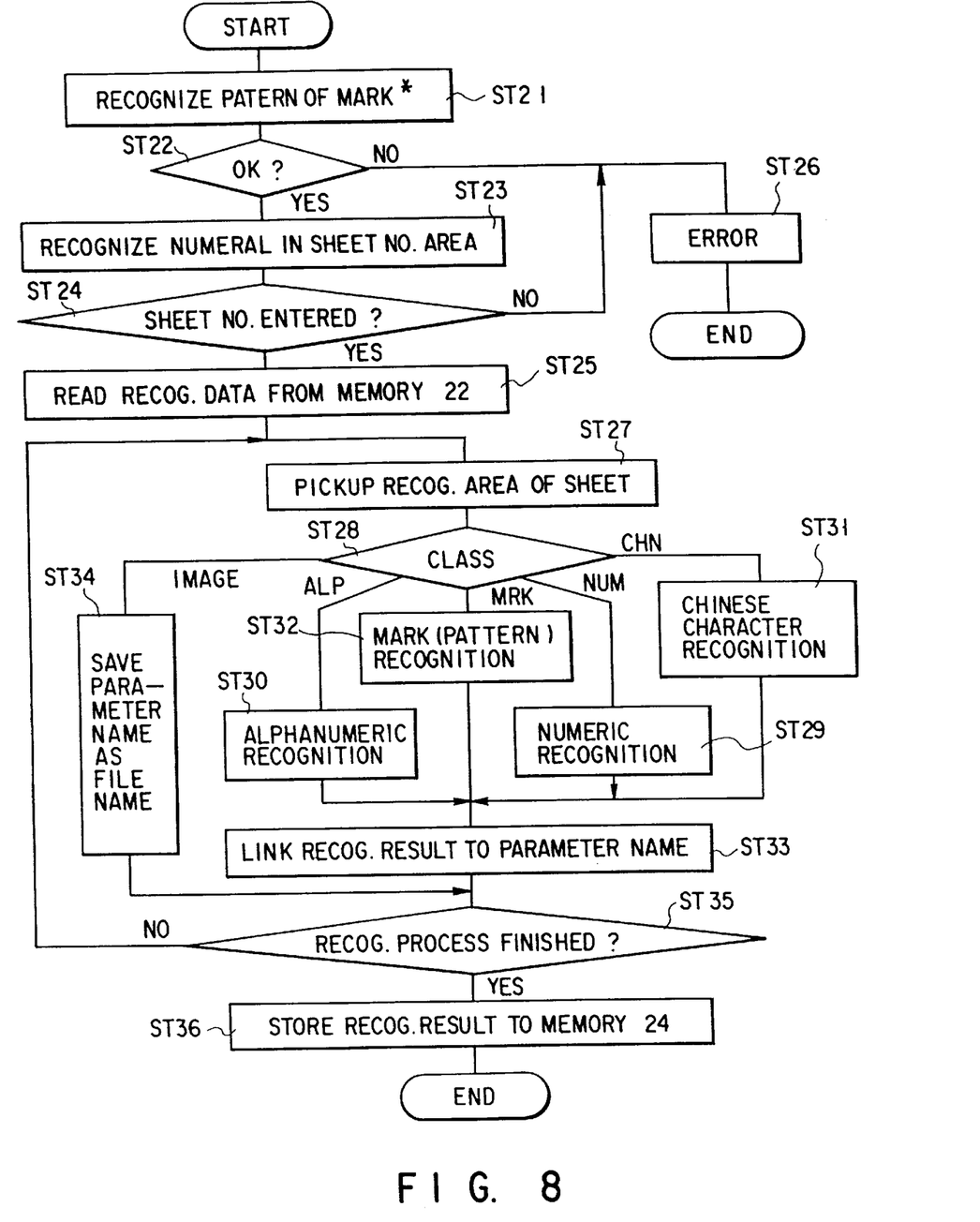
FIG. 8 is a flow chart for explaining a processing flow in instruction sheet decoder 12 in the embodiment shown in FIG. 1.

FIG. 8 shows a processing flow in instruction sheet decoder 12.

Instruction sheet decoder 12 starts recognition when contents D15 of handwriting sheet P read as an image are transferred from sheet reader 15 thereto.

Instruction sheet decoder 12 recognizes that the input sheet is an instruction sheet and attempts to recognize the pattern of mark "*" printed at the upper right end of handwriting sheet P in accordance with pattern matching (step ST21).

As a result of pattern recognition, if the input sheet is determined as an instruction sheet (YES in step ST22), the numeral (10100) in the sheet No. area present in a fixed position different from the position of mark "*" is recognized (step ST23).

When the recognition process is normally completed and if the resultant sheet No. (10100) obtained as a result of recognition is stored in the system (19) (YES in step ST24), recognition data RD is loaded from recognition data memory 22 to instruction sheet decoder 12 (step ST25).

If the input sheet is determined not to be an instruction sheet (NO in step ST22), sheet No. recognition process results in an error (NO in step ST24), or the resultant sheet No. obtained as a result of recognition is determined not to be stored in the system (NO in step ST24), the corresponding error messages are informed (step ST26).

The sheet parts are recognized in the ascending order of parts Nos. with reference to loaded recognized data RD.

More specifically, an image data area represented by recognition area 220d is picked up from contents D15 of read sheet P (step ST27) and recognition class 220c of each part is determined (step ST28).

If the class represents a numeral, numeric recognition is performed (step ST29); if an alphanumeric value, alphanumeric recognition (step ST30); if a Kanji, Kanji recognition (step ST31); and if a mark, mark recognition (step ST32).

Since the above recognition techniques are known to those skilled in the art, a detailed description thereof will be omitted.

Thereafter, the recognized results are linked to parameter names (step ST33).

That is, sheet No. 240a, parameter name 240b, and value 240c obtained as a result of recognition constitute a set which is then added to recognized result D12.

If the recognition class is not one of the classes described above (steps ST29 to ST32) (an image in step ST28), the parameter name is determined to instruct a file name. The image in the extracted image data area is stored as image data in a file (a hard disk; not shown) (step ST34).

The image may be a handwritten memo or a seal.

It is determined whether the recognition processes of all parts Nos. 220b are completed (step ST35). If NO in step ST35, the flow returns to the recognition area pickup process (step ST27). However, if YES in step ST35, recognized result D12 is stored in recognized result memory 24 (step ST36).

If the recognized result represents an error, a special value (e.g., −1) representing an error is stored as value 240c of parameter name 240b corresponding to recognized result D12.

Recognized result D12 shown in FIG. 6 is obtained by the process in instruction sheet decoder 12.

Figure 9:
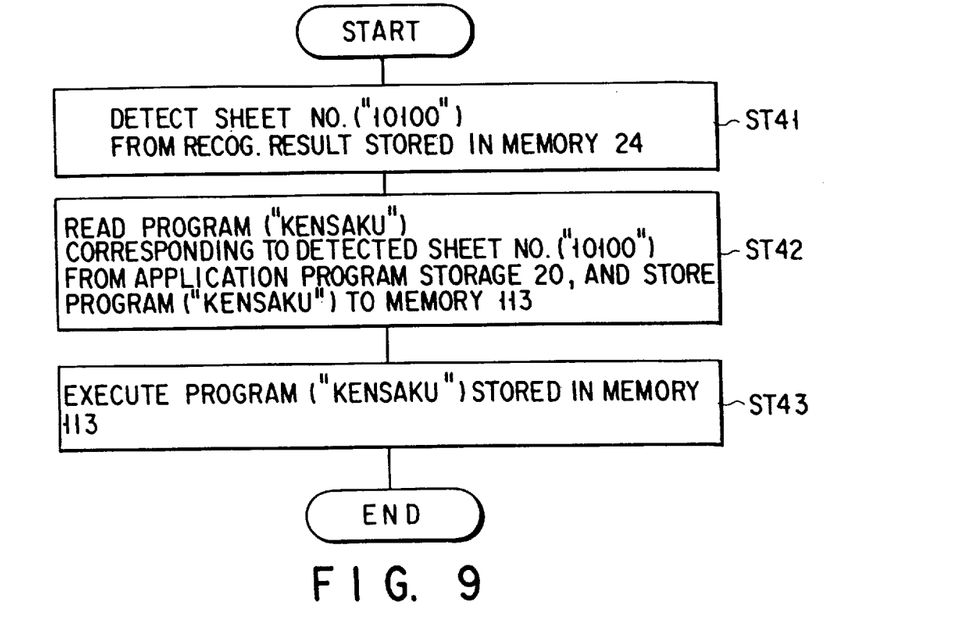
FIG. 9 is a flow chart for explaining a processing flow in program execution unit 13 in the embodiment shown in FIG. 1.

The process in program execution unit 13 will be described with reference to FIG. 9.

Program execution unit 13 receives execution data ED from execution data memory 23 and command 240 corresponding to recognized result D12 from recognized result memory 24.

Program execution unit 13 finds the same sheet No. 230a(=10100) as sheet No. 240a represented by command 240 from execution data ED (step ST41) and obtains corresponding program name 230b and corresponding parameter 230c (ST42).

Program execution unit 12 finds parameter names represented by resultant parameters 230c from parameter names 240b in command 240 in the order of parameter names and starts a program represented by resultant program name 230b using corresponding values as arguments (step ST43).

An actual process is executed in accordance with the job instruction written in handwriting sheet P.

For example, assume that contents of an instruction sheet designed with reference to an A4-size sheet are printed on A5- or B5-size handwriting sheet P. In this case, data PD read out from print data memory 21 cannot be directly used. Data PD must be subjected to similarity conversion with respect to the print size.

Figure 10:
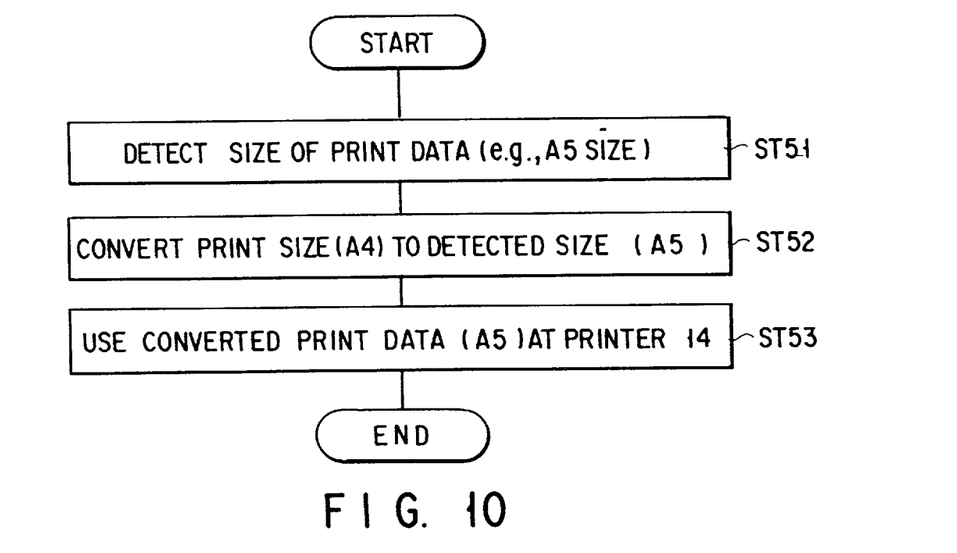
FIG. 10 is a flow chart for explaining a flow of data similarity conversion processing in print size converter 114 in the embodiment shown in FIG. 1.

FIG. 10 is a flow chart for explaining an operation of print size converter 114 for performing this similarity conversion.

When a user selects an A5-size paper sheet from several kinds of paper sheets (e.g., A4, B5, and A5) set in printer 14, CPU (or the CPU in execution unit 13) in converter 114 detects that the size of print data is A4 (step ST51). A similarity conversion process for reducing both the length and width of the paper sheet represented by data PD into ½ is performed because print data PD is A4-size paper data (step ST52). Printer 14 prints the format shown in FIG. 2A on an A5-size paper sheet on the basis of the print data after ½ reduction similarity conversion (step ST53).

Take another example which requires such similarity conversion. Assume that the instruction sheet shown in FIG. 2B is designed under the condition that data is displayed on display unit 31 having a resolution of 1,024×768 dots complying with the SVGA (Super Video Graphics Array) standards. If SVGA-designed data (PD*) is to be displayed on display unit 31 having a resolution of 640×480 dots complying with the VGA (Video Graphics Array) standards, part of the sheet data falls outside the screen and cannot be observed if no special processing is performed. When this happens, it may become impossible to write predetermined items on the sheet.

On the other hand, if a VGA-designed sheet is to be displayed in the SVGA mode, the displayed sheet is small to make it difficult to input data unless an SVGA monitor having a large screen size is used.

When a sheet screen designed at a predetermined display size/resolution (e.g., a resolution of 1,024×768 dots on a 17" monitor) is to be displayed at another display size/resolution (e.g., a resolution of 2,400×1,200 dots on a 20" monitor) or still another display size/resolution (e.g., a resolution of 640×480 dots on a 14" monitor), data PD* read out from print data memory 21 cannot be directly used. For this reason, data PD* must be subjected to similarity conversion with respect to the display size/resolution.

Figure 11:
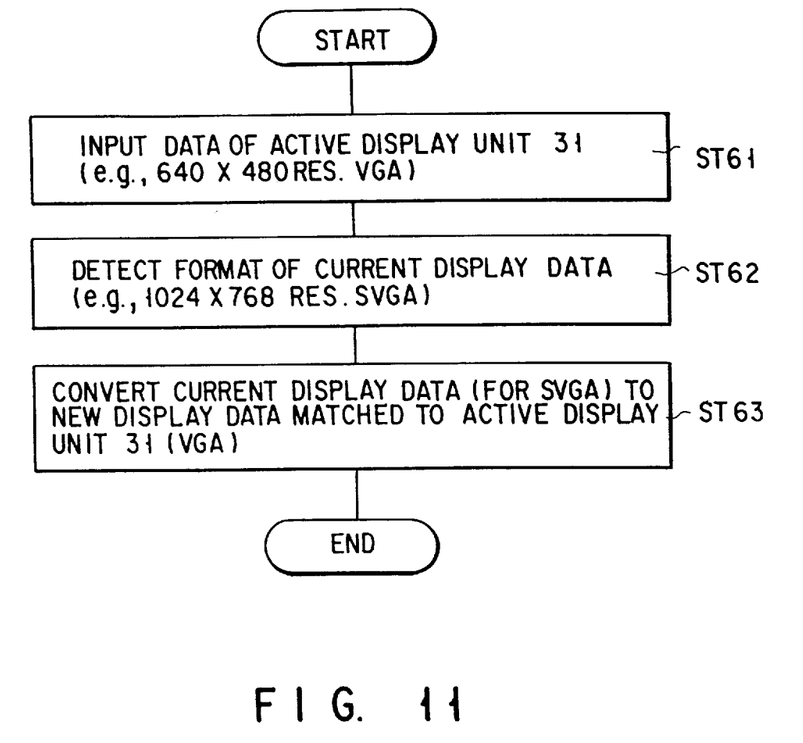
FIG. 11 is a flow for explaining a flow of data similarity conversion processing in display size/resolution converter 116 in the embodiment shown in FIG. 1.

FIG. 11 is a flow chart for explaining an operation of display size/resolution converter 116 for performing this similarity conversion.

Display size/resolution data (display specification) of active display unit 31 is input from input device 17 (step ST61). The CPU (or the CPU in execution unit 13) in converter 116 detects that the monitor used is a 14" VGA monitor having a resolution of 640×480 dots. The CPU then detects the format (1,024×768 resolution SVGA) of the current display data (PD*) (step ST62).

When the format of the display data (PD*) and the display size/resolution data (14" 640×480 resolution VGA) of the used monitor are obtained, the vertical/horizontal dots of the image data of 1,024×760 dots are thinned (step ST63). The dot data are thinned such that display image 31 (FIG. 2B) most resembles the impression of sheet P (FIG. 2A) on which display image 31 is printed when it is displayed on the 14" 640×480 resolution VGA monitor.

If, on the other hand, SVGA format data (PD*) is to be displayed on a 20" 2,400×1,200 resolution monitor, the length and width are increased in accordance with dot count ratios (i.e., ratios of 1,024 dots to 2,400 dots, and 768 dots to 1,200 dots), and at the same time the enlargement process is also performed in accordance with the screen size ratio (i.e., a ratio of 17" to 20") (step ST63).

The thinning/enlargement process in step ST63 becomes similarity conversion.

An input operation at input device 17 will be described below.

Input device 17 is operated for each part class of each part displayed on the screen at terminal 31 by display controller 16 so as to obtain the same effect as in handwriting information on handwriting sheet P in accordance with simple operations (e.g., keyboard and mouse operations).

Figure 12A:
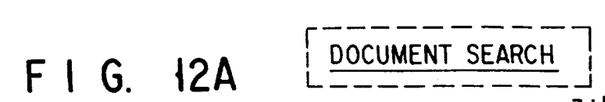
FIGS. 12A to 12C are views for explaining practical input operations at input device 17 in the embodiment shown in FIG. 1.
Figure 12B:
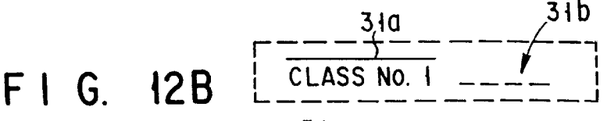
Figure 12C:
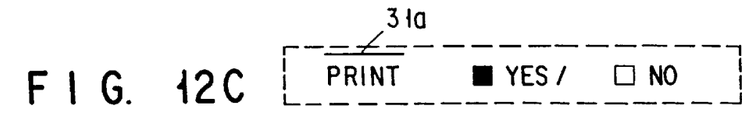

FIGS. 12A to 12C are parts displayed on the screen at terminal 31.

FIG. 12A shows a character string display part. In this case, only character string "Document Search" is displayed on the screen at terminal 31 under the control of display controller 16. No input operation is defined.

FIG. 12B shows a character string input part. In this case, arrow keys or a mouse is used to move cursor 31a to select a target input part from the parts displayed on the screen at terminal 31 under the control of display controller 16, and then an input character string is input. Alternatively, an appropriate item is selected from the displayed choices to write a character string in character space 31b as in handwriting information on handwriting sheet P.

When a target input part is selected, the character string input may be accepted by opening a character string input window at a position where the target input part is present. Alternatively, the character string input window may be opened at the lower portion of the screen to accept the character input.

FIG. 12C shows a mark part (mark) input. In this case, the arrow keys or mouse is used to move cursor 31a to select a target input part from the parts displayed on the screen at terminal 31 under the control of display controller 16, and a key (e.g., an "Y" or "N" key) for painting a corresponding square is depressed, or the mouse is operated to instruct to paint the mark. Therefore, one of the squares (paining marks) is painted as in handwriting information on handwriting sheet P.

The mouse operation for instructing this painting is performed such that the mouse cursor is moved inside a rectangular area (i.e., a dotted area in FIG. 12C) containing the painting marks and the corresponding character strings, and the mouse button is clicked. With this operation, the painting mark is painted as in manually painting the "square" on handwriting sheet P.

If an input is an image part (image), an image is drawn with the arrow keys or mouse using a normal paint lift within the area represented by the image data area displayed on the screen at terminal 31 under the control of display controller 16. Alternatively, a scanner is used to input an image. With this operation, a given image is stored as image data in a file as in manually drawing an image within the image data area on handwriting sheet P.

As described above, a user can input an instruction of job contents simpler than an operation of manually writing information on a paper sheet as if the user were looking at the paper sheet.

Figure 13:
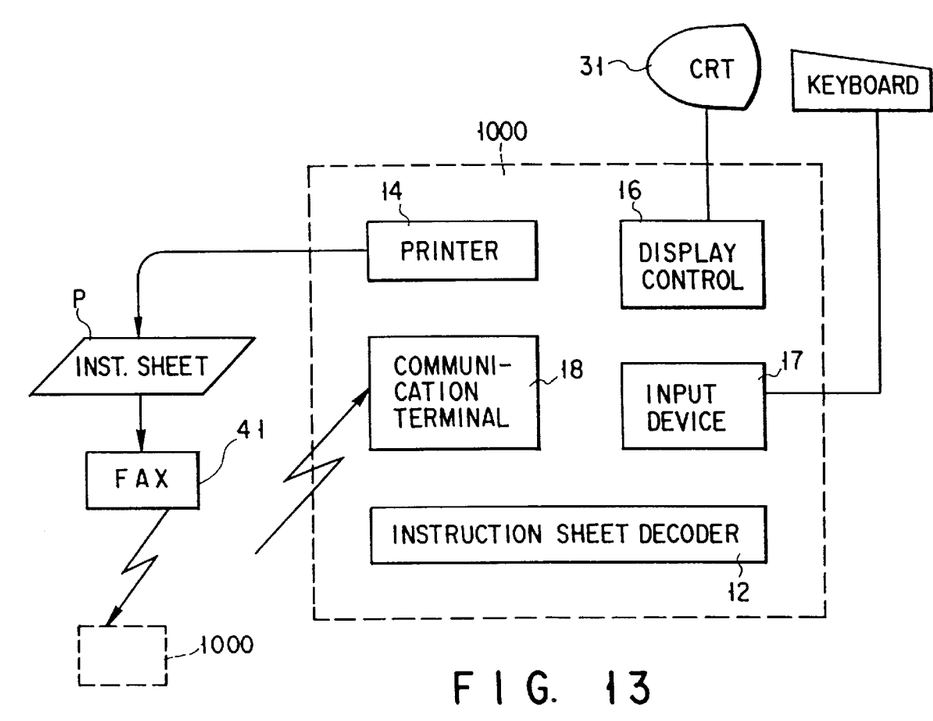
FIG. 13 is a block diagram for explaining a system in which a plurality of apparatuses each having an arrangement shown in FIG. 1 are connected through a communication line.

FIG. 13 schematically shows a system configuration when job instruction processing apparatus 100 is applied to a workstation or personal computer having a FAX (electronic mail).

If a job instruction is to be given using a FAX, the format of handwriting sheet P is printed and output at printer 14 on the basis of print data PD in print data memory 21. After necessary items are filled out in handwriting sheet P, it is transmitted from FAX 41 (in an electronic mail, print data PD itself prior to printout is transmitted in accordance with a predetermined protocol).

The FAX-transmitted data is received through communication terminal 18 of another job instruction processing apparatus 1000 and sent to instruction sheet decoder 12. After the recognition process as described above, a job is executed in accordance with resultant recognition data RD and resultant execution data ED.

In this manner, when FAX 41 can be used, job contents can be executed at another workstation or personal computer using an instruction sheet.

When a job instruction is to be given utilizing a workstation or personal computer, a screen similar to the format of handwriting sheet P is displayed on the screen at terminal 31 under the control of display controller 16 on the basis of print data PD stored in print data memory 21. The job contents are instructed as in manually writing information on handwriting sheet P in accordance with key or mouse operations at input device 17.

In this case, the job is executed in accordance with recognition data RD as an operation input (D17) from input device 17 and execution data ED read out from execution data memory 23.

As described above, a job content instruction from a workstation or personal computer can be directly executed at this workstation or personal computer in accordance with operations on the screen at terminal 31.

More specifically, when exchange of instructions of job contents and results of job execution by a plurality of persons is taken into consideration, a person engaged in one job does not necessarily utilize the same equipment under the same circumstance. A difference in equipment configuration allows selection of a method of instructing the job contents suitable for given circumstances. Therefore, job contents suitable for a variety of circumstances can be instructed, input, and executed.

As described above, instruction sheet P itself for instructing job contents can be designed, and at the same time, job instruction methods (a handwriting sheet use method and a keyboard/mouse input method) can be selected.

More specifically, a handwriting sheet capable of executing an arbitrary program can be designed, and at the same time job contents can be instructed in accordance with operations on the screen as if the job contents can be designed using the handwriting sheet. An instruction method can be appropriately selected in accordance with a user and an equipment configuration, and jobs can be instructed in accordance with suitable methods. Therefore, the load on the user who instructs a job can be reduced without limiting the kinds of instructable jobs.

The present invention is not limited to instructions. Data such as a handwritten memo and a seal can be directly stored as image data in the image data area shown in FIG. 2A.

The present invention is not limited to the particular embodiment described above. Various changes and modifications may be made without departing from the spirit and scope of the invention.

As has been described above, according to the present invention, there can be provided a job instruction processing apparatus capable of instructing job contents in accordance with a method suitable for given circumstances without limiting the kinds of jobs even if different equipment configurations are used.

Additional advantages and modifications will readily occur to those skilled in the art. Therefore, is the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing apparatus for executing a plurality of information processing operations, said apparatus comprising:

means for designing an instruction sheet, including:
  means for defining a number of parts to be included in said instruction sheet and for assigning a number to each part identifying an associated part of said instruction sheet,
  means for identifying a location of each part included in said instruction sheet, and
  means for assigning attributes for each part included in said instruction sheet, said attributes defining items to be displayed in said associated part of said instruction sheet, wherein information format data comprises said number of parts, said location of said parts, and said attributes for each part, said information format data being associated with said instruction sheet to define a format for said instruction sheet;

a memory for storing, in advance, said information format data;

means for printing a first pattern on a sheet, said first pattern corresponding to said format defined by said information format data stored in said memory;

means, including a display device, for displaying a second pattern on said display device, said second pattern corresponding to said format defined by said information format data stored in said memory so that said second pattern displayed by said display means corresponds to said first pattern printed on said sheet, thereby presenting a user of said information processing apparatus with substantially similar output formats by means of said sheet and said display device corresponding to said format of said instruction sheet;

means for executing at least one of said plurality information processing operations in accordance with an instruction for executing at least one of said plurality of information processing operations provided thereto;

first inputting means for inputting said instruction for executing at least one of said plurality of information processing operations to said executing means, said first inputting means including means for recognizing and decoding said instruction from information provided on said sheet and providing said instruction to said executing means; and second inputting means for inputting said instruction for executing at least one of said plurality of information processing operations to said executing means, said second inputting means including:
   an input device of a type suitable to enter information into a computer based on said second pattern displayed by said displaying means,
   means for recognizing said instruction entered via said input device, and
   means for providing said instruction to said executing means thus enabling said user to optionally enter said instruction for executing at least one of said plurality of information processing operations via one of said sheet and said input device.

2. The apparatus of claim 1, wherein said designing means includes means for preparing recognition data to be used for recognizing information printed on said sheet, said apparatus further comprising:
   means for storing said recognition data prepared by said preparing means, and for supplying said stored recognition data to said recognizing means.

3. The apparatus of claim 2, wherein said means for preparing recognition data includes:
   means for defining which of said parts of said sheet are to be recognized and for identifying said parts of said sheet to be recognized by said associated part number,
   means for identifying a location on said sheet of each part of said sheet to be recognized, and
   means for assigning recognition information to each part of said sheet to be recognized, said recognition information including:
      first information indicating a type of information to be recognized in a part of said sheet to be recognized, and
      second information corresponding to said instruction to be provided to said executing means.

4. The apparatus of claim 3, further comprising means for causing said printing means to provide a code pattern on said sheet and for causing said display means to provide said code pattern in said second pattern displayed by said display means, said code pattern being provided in substantially a same position on said sheet and said second pattern, wherein said reading means also detects said code pattern.

5. The apparatus of claim 1, wherein said designing means includes means for providing execution data corresponding to at least one of said plurality of information processing operations, said apparatus further comprising:
   means for storing said execution data provided by said providing means, and for supplying said stored execution data to said executing means so that said executing means executes said information processing operation using said execution data.

6. The apparatus of claim 1, wherein said display device has a predetermined display resolution and said means for displaying includes:
   means for converting a display specification of said information format data into a second display specification that matches said display resolution of said display unit; and
   means for supplying said information format data having said second display specification to said display unit.

7. The apparatus of claim 1, further comprising means for converting a print size of said information format data into a size suitable for printing on said print sheet by said printing means.

8. An information processing apparatus for executing a plurality of information processing operations, said apparatus comprising:

means for designing a format, represented by information format data, for an instruction sheet, wherein said instruction sheet is used to provide an instruction for executing at least one of said plurality of information processing operations to said information processing apparatus, said means for defining said format for said instruction sheet including:
   means for defining a number of parts to be included in said instruction sheet and for assigning a number to each part identifying an associated part of said instruction sheet,
   means for identifying a location of each part included in said instruction sheet, and
   means for assigning attributes for each part included in said instruction sheet, said attributes defining items to be displayed in an associated part of said instruction sheet, wherein said information format data comprises said number of parts, said location of said parts, and said attributes for each part;

means for preparing recognition data used for recognizing said instruction for executing at least one of said plurality of information processing operations from information contained on a sheet;

means for providing execution data used for executing at least one of said plurality of information processing operations;

a first memory for storing said information format data produced by said designing means;

a second memory for storing said recognition data prepared by said preparing means;

a third memory for storing said execution data provided by said providing means;

means for printing said sheet such that said sheet has a first pattern in accordance with said information format data stored in said first memory;

means for displaying a second pattern on a display device in accordance with said information format data stored in said first memory, said second pattern corresponding to said first pattern printed on said sheet so that a user of said information processing apparatus is presented with substantially similar output formats by means of said sheet and said display device, said substantially similar output formats corresponding to said format of said instruction sheet;

means for executing at least one of said plurality information processing operations in accordance with said instruction for executing at least one of said plurality of information processing operations provided thereto;

first inputting means for inputting said instruction for executing at least one of said plurality of information processing operations to said executing means, said first inputting means including means for recognizing said instruction from information provided on said sheet based on said recognition data stored in said second memory and means for providing said instruction to said executing means; and second inputting means for inputting said instruction for executing at least one of said plurality of information processing operations to said executing means, said second inputting means including:
   an input device of a type suitable to enter information into a computer based on said second pattern displayed by said displaying means,
   means for recognizing said instruction entered via said input device, and means for providing said instruction to said executing means displayed by said displaying means thus enabling said user to optionally enter said instruction for executing at least one of said plurality of information processing operations via one of said sheet and said input device.

9. The apparatus of claim 8, wherein said means for preparing recognition data includes:

means for defining which of said parts of said sheet are to be recognized and for identifying said parts of said sheet to be recognized by said associated part number, means for identifying a location on said sheet of each part of said sheet to be recognized, and means for assigning recognition information to each part of said sheet to be recognized, said recognition information including:

first information indicating a type of information to be recognized in a part of said sheet to be recognized, and second information corresponding to said instruction to be provided to said executing means.

10. The apparatus of claim 9, further comprising:

means for causing said printing means to provide a code pattern on said sheet and for causing said display means to provide said code pattern in said second pattern displayed by said display device, said code pattern being provided in substantially a same position on said sheet and said second pattern displayed by said display device, and recognizing means for detecting said code pattern.

11. An information processing apparatus for executing a plurality of information processing operations, said apparatus comprising:

means for producing an instruction sheet having a format, including:

means for defining a number of parts to be included in said instruction sheet and for assigning a number to each part identifying an associated part of said instruction sheet, means for identifying a location of each part included in said instruction sheet, and means for assigning attributes for each part included in said instruction sheet, said attributes defining items to be displayed in an associated part of said instruction sheet, wherein information format data which defines a format for said instruction sheet comprises said number of parts, said location of said parts, and said attributes for each part;

means for storing, in advance, said information format data produced by said producing means;

outputting means, which reads said information format data from said storing means, for performing one of:

printing out said instruction sheet as a printed instruction sheet having said format of said instruction sheet, and displaying an image of said instruction sheet, said image having said format of said instruction sheet;

means for reading information written on said instruction sheet printed by said outputting means;

means for electrically inputting information to said image displayed by said outputting means; and means for executing a prescribed processing operation according to one of information obtained by said means for reading and information input by said means for electrically inputting information, thus enabling a user of said information processing apparatus to optionally enter information thereto using one of said printed instruction sheet by hand-writing an instruction thereon and said displayed instruction sheet by electrically entering said instruction, both of said printed sheet and said displayed instruction sheet having substantially similar configurations corresponding to said format of said instruction sheet.

12. The apparatus of claim 11, further comprising:

means for preparing recognition data used for recognizing information contained on said printed instruction sheet, including:

means for defining which of said parts of said instruction sheet are to be recognized and for identifying said parts of said instruction sheet to be recognized by said part number, means for identifying a location on said instruction sheet of each part of said instruction sheet to be recognized, and means for assigning recognition information to each part of said instruction sheet to be recognized, said recognition information including:

first information indicating a type of information to be recognized in a part of said instruction sheet to be recognized, and second information corresponding to an instruction to be provided to said executing means for causing said executing means to execute a prescribed processing operation.

13. The apparatus of claim 12, further comprising means for causing said outputting means to provide a code pattern on said printed instruction sheet and for causing said display to include said code pattern, said code pattern being provided in substantially a same position on said printed instruction sheet and said display, wherein said recognizing means also detects said code pattern.

* * * * *